(12) United States Patent
Lu et al.

(10) Patent No.: US 12,148,200 B2
(45) Date of Patent: Nov. 19, 2024

(54) IMAGE PROCESSING METHOD, IMAGE PROCESSING APPARATUS, AND DEVICE

(71) Applicant: BOE Technology Group Co., Ltd., Beijing (CN)

(72) Inventors: Yunhua Lu, Beijing (CN); Hanwen Liu, Beijing (CN); Pablo Navarrete Michelini, Beijing (CN); Lijie Zhang, Beijing (CN); Dan Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 638 days.

(21) Appl. No.: 17/419,726

(22) PCT Filed: Dec. 29, 2020

(86) PCT No.: PCT/CN2020/140781
§ 371 (c)(1),
(2) Date: Jun. 30, 2021

(87) PCT Pub. No.: WO2021/164429
PCT Pub. Date: Aug. 26, 2021

(65) Prior Publication Data
US 2022/0319155 A1    Oct. 6, 2022

(30) Foreign Application Priority Data

Feb. 21, 2020    (CN) .......................... 202010110386.7

(51) Int. Cl.
*G06V 10/77*    (2022.01)
*G06N 3/045*    (2023.01)
(Continued)

(52) U.S. Cl.
CPC ......... *G06V 10/7715* (2022.01); *G06N 3/045* (2023.01); *G06N 3/08* (2013.01);
(Continued)

(58) Field of Classification Search
CPC .... G06V 10/7715; G06V 10/80; G06V 10/82; G06V 10/454; G06V 10/26; G06N 3/045;
(Continued)

(56) References Cited

U.S. PATENT DOCUMENTS

2019/0221011 A1    7/2019  Ye et al.

FOREIGN PATENT DOCUMENTS

| CN | 109145922 A | 1/2019 |
| CN | 109448006 A | 3/2019 |

(Continued)

OTHER PUBLICATIONS

"Xiaohan Ding et. al., ACNet: Strengthening the Kernel Skeletons for Powerful CNN via Asymmetric Convolution Blocks, 2019, Proceedings of the IEEE/CVF International Conference on Computer Vision, pp. 1911-1920" (Year: 2019).*

(Continued)

*Primary Examiner* — Andrae S Allison
*Assistant Examiner* — Phuong Hau Cai
(74) *Attorney, Agent, or Firm* — Ling Wu; Stephen Yang; Ling and Yang Intellectual Property

(57) ABSTRACT

A method for processing an image includes acquiring an input image, performing down-sampling and feature extraction on the input image by an encoder network to obtain multiple feature maps, and performing up-sampling and feature extraction on the multiple feature maps by a decoder network to obtain a target segmentation image. Processing levels between the encoder network and the decoder network for outputting feature maps with the same resolution are connected with each other. The encoder network and the decoder network each includes one or more dense calculation blocks, and at least one convolution module in any dense computation block includes at least one group of asymmetric convolution kernels.

20 Claims, 6 Drawing Sheets

(51) Int. Cl.
*G06N 3/08* (2023.01)
*G06T 3/4046* (2024.01)
*G06V 10/80* (2022.01)
*G06V 10/82* (2022.01)

(52) U.S. Cl.
CPC ............ *G06T 3/4046* (2013.01); *G06V 10/80* (2022.01); *G06V 10/82* (2022.01)

(58) Field of Classification Search
CPC ...... G06N 3/08; G06N 3/0455; G06N 3/0464; G06N 3/09; G06T 3/4046; G06T 2207/10024; G06T 2207/20016; G06T 2207/20081; G06T 2207/20084; G06T 7/194; G06T 2207/30196; G06F 18/253
See application file for complete search history.

(56) References Cited

FOREIGN PATENT DOCUMENTS

| CN | 109727253 A | | 5/2019 | |
|---|---|---|---|---|
| CN | 110188760 A | * | 8/2019 | ............ G06K 9/342 |
| CN | 110197516 A | | 9/2019 | |
| CN | 110689544 A | * | 1/2020 | |
| CN | 111311629 A | | 6/2020 | |
| CN | 111369581 A | * | 7/2020 | ........... G06N 3/0454 |

OTHER PUBLICATIONS

Kuan-Lun Tseng et. al., Joint Sequence Learning and Cross-Modality Convolution for 3D Biomedical Segmentation, 2017, Proceedings of the IEEE Conference on Computer Vision and Pattern Recognition, pp. 6393-6400 (Year: 2017).*
"Yifan Wang et. al., Information-Compensated Downsampling for Image Super-Resolution, Mar. 2018, IEEE Signal Processing Letters, vol. 25, Issue 5" (Year: 2018).*
"Qi Bi et. al., APDC-Net: Attention Pooling-Based Convolutional Network for Aerial Scene Classification, Nov. 2019, IEEE Geoscience and Remote Sensing Letters, vol. 17, Issue 9" (Year: 2019).*
"Seokjun Seo et. al., Towards Real-Time Automatic Portrait Matting on Mobile Devices, Apr. 2019, Computer Vision and Pattern Recognition, Artificial Intelligence" (Year: 2019).*
"Quan Chen et. al., Semantic Human Matting, Oct. 2018, MM.18, Seoul, Republic of Korea" (Year: 2018).*
"Liqin Huang et. al., Pyramid-Structured Depth MAP Super-Resolution Based on Deep Dense-Residual Network, Dec. 2019, IEEE Signal Processing Letters vol. 26, Issue 12" (Year: 2019).*

* cited by examiner

IMAGE PROCESSING METHOD, IMAGE PROCESSING APPARATUS, AND DEVICE

CROSS-REFERENCE TO RELATED APPLICATIONS

The present disclosure is a U.S. National Phase Entry of International Application PCT/CN2020/140781 having an international filing date of Dec. 29, 2020, which claims priority of Chinese Patent Application No. 202010110386.7 filed on Feb. 21, 2020, and the contents disclosed in the above-mentioned Chinese patent application are hereby incorporated as a part of this application.

TECHNICAL FIELD

The present disclosure relates to a method, an apparatus and a device for processing image.

BACKGROUND

Image matting is a research direction in the field of image processing and computer vision, a foreground and a background in an image may be separated with each other by the image matting. Results of the image matting may have multiple applications, such as background replacement, ID photo generation, virtual group photo generation, virtual scenery, background blur and so on.

SUMMARY

The present disclosure provides a method, an apparatus and a device for processing image.

In an aspect, the present disclosure provides a method for processing an image, including: acquiring an input image; performing down-sampling and feature extraction on the input image by an encoder network to obtain multiple feature maps; and performing up-sampling and feature extraction on the multiple feature maps by a decoder network to obtain a target segmentation image; wherein the encoder network and decoder network each includes multiple processing levels, multiple feature maps obtained at a L-th processing level in the encoder network and multiple feature maps obtained at a J-th processing level in the decoder network are input, after being fused, to a (J+1)-th processing level in the decoder network, and wherein the multiple feature maps obtained at the L-th processing level in the encoder network and the multiple feature maps obtained at the J-th processing level in the decoder network have a same resolution; L and J are both positive integers; wherein at least one processing level of the multiple processing levels of the encoder network includes a dense calculation block, and at least one processing level of the multiple processing levels of the decoder network includes a dense calculation block; a M-th dense calculation block in each of the encoder network and the decoder network includes N convolution modules, and an input of an i-th convolution module among the N convolution modules includes outputs of i−1 convolution modules previous to the i-th convolution module; at least one convolution module of the N convolution modules includes at least one group of asymmetric convolution kernels; i, N and M are all integers, M is greater than or equal to 1 and smaller than or equal to a total number of the dense calculation blocks in the encoder network and decoder network, N is greater than or equal to 3, and i is greater than or equal to 3 and smaller than or equal to N.

In another aspect, the present disclosure provides an apparatus for processing an image, which includes: an image acquisition module configured to acquire an input image; and an image processing module configured to perform down-sampling and feature extraction on the input image by an encoder network to obtain multiple feature maps; perform up-sampling and feature extraction on the multiple feature maps by a decoder network to obtain a target segmentation image; wherein the encoder network and decoder network each includes multiple processing levels, multiple feature maps obtained at a L-th processing level in the encoder network and multiple feature maps obtained at a J-th processing level in the decoder network are input, after being fused, to a (J+1)-th processing level in the decoder network, and wherein the multiple feature maps obtained at the L-th processing level in the encoder network and the multiple feature maps obtained at the J-th processing level in the decoder network have a same resolution; L and J are both positive integers; wherein at least one processing level of the multiple processing levels of the encoder network includes a dense calculation block, and at least one processing level of the multiple processing levels of the decoder network includes a dense calculation block; a M-th dense calculation block in each of the encoder network and the decoder network includes N convolution modules, and an input of an i-th convolution module among the N convolution modules includes outputs of i−1 convolution modules previous to the i-th convolution module; at least one convolution module of the N convolution modules includes at least one group of asymmetric convolution kernels; i, N and M are integers, M is greater than or equal to 1 and smaller than or equal to a total number of the dense calculation blocks in the encoder network and the decoder network, N is greater than or equal to 3, and i is greater than or equal to 3 and smaller than or equal to N.

In another aspect, the present disclosure provides a device for processing an image, which includes: a memory and a processor, wherein the memory is configured to store program instructions, and the processor, when executing the program instructions, implements steps of the above method for processing an image.

In another aspect, the present disclosure provides a computer readable storage medium, in which program instructions are stored, wherein the program instructions, when executed, implement the above method for processing an image.

BRIEF DESCRIPTION OF DRAWINGS

Accompanying drawings are used to provide an understanding of technical solutions of the present disclosure and form a part of the specification. Together with embodiments of the present disclosure, they are used to explain technical solutions of the present disclosure but do not constitute a limitation on the technical solutions of the present disclosure.

DETAILED DESCRIPTION

Figure 1:
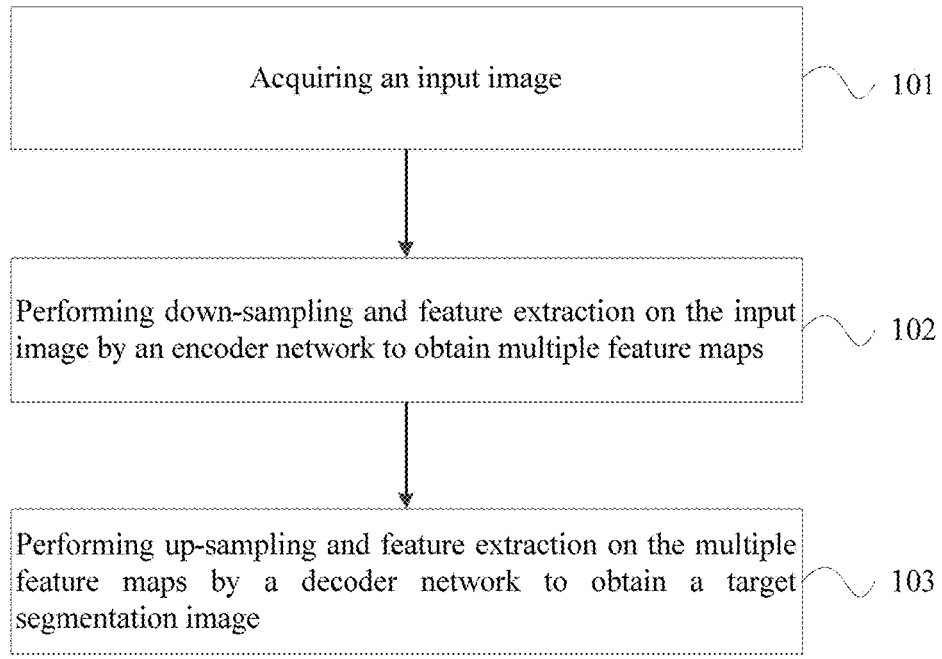
FIG. 1 is a flowchart of a method for processing an image according to an embodiment of the present disclosure.

Multiple embodiments are described in the present disclosure, but the description is exemplary rather than restrictive, and it is apparent to those of ordinary skills in the art that there may be more embodiments and implementations within the scope of the embodiments described in the present disclosure. Although many possible combinations of features are shown in the drawings and discussed in the embodiments, many other combinations of the disclosed features are also possible. Unless specifically limited, any feature or element of any embodiment may be used in combination with or in place of any other feature or element of any other embodiment.

The present disclosure includes and contemplates combinations of features and elements known to those of ordinary skills in the art. The disclosed embodiments, features and elements of the present disclosure may be combined with any conventional features or elements to form a unique solution defined by the claims. Any feature or element of any embodiment may also be combined with features or elements from another technical solution to form another unique technical solution defined by the claims. Therefore, it should be understood that any of the features shown and discussed in the present disclosure may be implemented individually or in any suitable combination. Therefore, the embodiments are not otherwise limited except in accordance with the appended claims and equivalents thereof. In addition, various modifications and changes may be made within the protection scope of the appended claims.

Furthermore, when describing representative embodiments, the specification may have presented a method or process as a specific order of steps. However, to the extent that the method or process does not depend on the specific order of steps described herein, the method or process should not be limited to the specific order of steps described. As those of ordinary skills in the art will understand, other orders of steps are also possible. Therefore, the specific order of steps set forth in the specification should not be interpreted as limitations on the claims. Furthermore, the claims for the method or process should not be limited to performing the steps in the order described, and those skilled in the art can readily understand that these orders may be varied but still remain within the essence and scope of the embodiments of the present disclosure.

Unless otherwise defined, technical terms or scientific terms used in the present disclosure shall have ordinary meanings understood by those of ordinary skills in the art to which the present disclosure belongs. The wordings "first", "second" and the like used in the present disclosure do not indicate any order, quantity or importance, but are only used to distinguish different components. In the present specification, "multiple" may mean two or more than two.

In order to make the following description of the embodiments of the present disclosure clear and concise, detailed description of some of known functions and known components are omitted in the present disclosure. The drawings of the embodiments of the present disclosure only relate to structures involved in the embodiments of the present disclosure, and for other structures, general designs may be referred to.

With development of the image processing technology, using the deep learning technology for image matting has gradually become a research hotspot. For example, multiple full convolutional deep neural networks with different structures connected in series are used to perform the following processing respectively: detecting a subject frame containing a subject which needs to be matted in an image to be matted, classifying pixels in the subject frame to obtain a trimap, and matting the subject in the subject frame according to the trimap. However, when the multiple full convolutional depth neural networks are used for matting, accuracy of an output result of a previous full convolutional neural network will affect the accuracy of an output result of a subsequent full convolutional neural network, which results in a poor image matting effect. Moreover, the convolutional depth neural network currently used for matting has a low calculation efficiency, and its processing speed cannot achieve real-time matting.

Convolutional Neural Networks (CNN) are a type of neural network structure that uses, for example, images as input and output, and replaces scalar weights with filters (convolution kernels). A convolution process may be regarded as using a trainable filter to convolve an input image or a convolution feature map, to output a convolution feature map, wherein a convolution feature map may also be referred to as a feature map. A convolution layer refers to a neuron layer which convolutes an input signal in the convolutional neural network. In the convolution layer of the convolutional neural network, one neuron is only connected with some neurons of adjacent layers. The convolution layer may apply several convolution kernels to the input image to extract various types of features of the input image. Each convolution kernel may extract one type of feature. The convolution kernel is usually initialized in the form of a matrix with a random size. In a training process of the convolutional neural network, the convolution kernel will get reasonable weights by learning. In the same convolution layer, multiple convolution kernels may be used to extract different image information.

Embodiments of the present disclosure provide a method, an apparatus and a device for processing image, which may utilize a convolutional neural network to process an input image and automatically generate a target segmentation image. The convolutional neural network provided by the embodiments of the present disclosure is combined with a dense calculation block with an asymmetric convolution kernel and an encoder-decoder network with a skip connection, which may improve the image matting effect and processing speed, reduce time required for calculations, support real-time automatic matting of the input image, and have better and wider application prospects.

FIG. 1 is a flowchart of a method for processing an image according to an embodiment of the present disclosure. As shown in FIG. 1, the method for processing an image provided by the embodiment of the present disclosure may include the following steps:

In step 101, an input image is acquired.

In step 102, down-sampling and feature extraction are performed on the input image by an encoder network to obtain multiple feature maps.

In step 103, up-sampling and feature extraction are performed on the multiple feature maps through a decoder network to obtain a target segmentation image.

The method for processing an image provided by this embodiment is used to separate a target object from a background in the input image, and the target segmentation image may be a matting mask of the target object. Among them, the target object may be a portrait in the input image or a preset detection object (for example, animal, building, etc.). However, the present disclosure is not limited to this.

In an exemplary implementation, the input image may include a person image, for example, the input image may be a person image taken by an image acquisition device such as a digital camera or a mobile phone, or a frame of person image in a video taken by the image acquisition device. However, the present disclosure is not limited to this.

Figure 2:
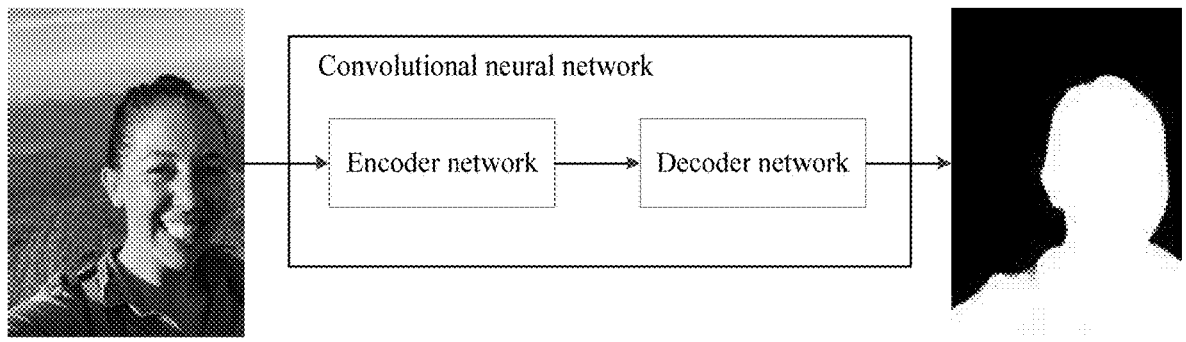
FIG. 2 is an example diagram of an input image and a generated target segmentation image according to an embodiment of the present disclosure.

FIG. 2 is an example diagram of an input image and a generated target segmentation image according to an embodiment of the present disclosure. As shown in FIG. 2, a convolutional neural network includes an encoder network and a decoder network. In this exemplary implementation, the target segmentation image is a matting mask of a target person in the input image. However, the present disclosure is not limited to this. For example, the target segmentation image may be an image of the target person matted from the input image.

As shown in FIG. 2, in an exemplary implementation, the input image is a grayscale image. However, the present disclosure is not limited to this. In practical application, the input image may be a color image, such as an RGB image.

Figure 3:
FIG. 3 is an example diagram of an application effect of the target segmentation image shown in FIG. 2.

FIG. 3 is an example diagram of an application effect of a target segmentation image shown in FIG. 2. In an example, for the target segmentation image (such as the matting mask of the target person shown in FIG. 2) obtained by the method for processing an image provided by the embodiment of the present disclosure, a human body region in the input image (such as a first picture in a first row in FIG. 3) may be matted out, and then synthesized into other natural scenes without a human body to realize background replacement. For example, a fourth picture in the first row in FIG. 3 is an example of an effect picture obtained after background replacement of the input image. In another example, by using the target segmentation image (such as the matting mask shown in FIG. 2) obtained by the method for processing an image provided by the embodiment of the present disclosure, the human body region in the input image (such as the first picture in the first row in FIG. 3) may be matted out, and then synthesized into other images containing human bodies and natural scenes to realize virtual group photo. For example, all images in FIG. 3 except the first picture in the first row and the fourth picture in the first row are example pictures of the effect after a virtual group photo is taken based the input image.

As shown in FIG. 2, the convolutional neural network provided by the embodiment of the present disclosure includes the encoder network and the decoder network, wherein the encoder network is configured to perform down-sampling and feature extraction on the input image to obtain multiple feature maps. The decoder network is configured to perform up-sampling and feature extraction on the multiple feature maps to obtain a target segmentation image.

In this embodiment, the encoder network and the decoder network each includes multiple processing levels, multiple feature maps obtained at a L-th processing level in the encoder network and multiple feature maps obtained at a J-th processing level in the decoder network are input, after being fused, to a (J+1)-th processing level in the decoder network. The multiple feature maps obtained at the L-th processing level in the encoder network and the multiple feature maps obtained at the J-th processing level in the decoder network have a same resolution, wherein L and J are both positive integers. Among them, one time of down-sampling and one time of feature extraction in the encoder network may be regarded as one processing level respectively, and one time of up-sampling and one time of feature extraction in the decoder network may be regarded as one processing level respectively. In this embodiment, L may have one or more values, and J may have one or more values. In an example, L and J each may have three values. For example, if L is 1 and J is 5, feature maps obtained at a first processing level in the encoder network and feature maps obtained at a fifth processing level in the decoder network have the same resolution, and the feature maps obtained at these two processing levels are input, after being fused, to a sixth processing level in the decoder network. If L is 2, and J is 1, feature maps obtained at a second processing level in the encoder network and the feature maps obtained at the first processing level in decoder network have the same resolution, and the feature maps obtained at these two processing levels are input, after being fused, to a second processing level in decoder network. If L is 3, and J is 3, the feature maps obtained at a third processing level in the encoder network and the feature maps obtained at a third processing level in the decoder network have the same resolution, and the feature maps obtained at these two processing levels are input, after being fused, to a fourth processing level in the decoder network.

In this embodiment, by inputting the multiple feature maps obtained at the L-th processing level in the encoder network and the multiple feature maps obtained at the J-th processing level in the decoder network, after being fused, to the (J+1)-th processing level in the decoder network, a skip connection may be realized between the encoder network and the decoder network, that is, the processing levels at which feature maps with the same resolution are obtained are connected, and the multiple feature maps obtained at these two processing levels are input, after being fused, to a next processing level in the decoder network The skip connection between the encoder network and the decoder network may increase reservation of image details in the decoder network, thus improving the accuracy of results of image matting.

In an exemplary implementation, inputting the multiple feature maps obtained at the L-th processing level in the encoder network and the multiple feature maps obtained at the J-th processing level in the decoder network, after being fused, to the (J+1)-th processing level in the decoder network, may include: the multiple feature maps obtained at the L-th processing level in the encoder network and the multiple feature maps obtained at the J-th processing level in the decoder network are input, after being concatenated in a channel dimension, to the (J+1)-th processing level in the decoder network. For example, the multiple feature maps obtained at the L-th processing level in the encoder network and the multiple feature maps obtained at the J-th processing level in the decoder network are fused through a concatenation (Concat) operation. However, the present disclosure is not limited to this. In other implementations, the multiple feature maps obtained at the L-th processing level in the encoder network and multiple feature maps processed at the J-th processing level in the decoder network may be fused through an addition (Add) operation or a multiplication operation. By inputting the feature maps with the same size and resolution obtained in the encoder network and decoder network, after being fused, to the decoder network, image details and information lost by the encoder network in a down-sampling process may be transferred to the decoder network, so that the decoder network may use the information to generate a more accurate target segmentation image in a process of restoring spatial resolution by up-sampling, thus improving the image matting effect.

In an exemplary embodiment, when the L-th processing level in the encoder network and the J-th processing level in the decoder network perform corresponding processing, and the multiple feature maps obtained at the L-th processing level in the encoder network and the multiple feature maps obtained at the J-th processing level in the decoder network have the same resolution, the multiple feature maps obtained at the L-th processing level in the encoder network and the multiple feature maps obtained at the J-th processing level in the decoder network may be input, after being fused, to the (J+1)-th processing level in the decoder network. The L-th processing level in the encoder network and the J-th processing level in the decoder network performing corresponding processing may be as follows: the L-th processing level in the encoder network performs down-sampling processing and the J-th processing level in the decoder network performs up-sampling processing; or, the L-th processing level in the encoder network performs multi-level feature extraction, and the J-th processing level in the decoder network also performs multi-level feature extraction. However, the present disclosure is not limited to this. In this exemplary implementation, the feature maps with the same resolution obtained at the processing levels corresponding to each other in the encoder network and the decoder network are input, after being fused, to the decoder network, which may improve the reservation effect on image details in a fused feature map, improve the accuracy of the target segmentation image obtained by the decoder network using the fused feature map, and thus improving the result of image matting.

In this embodiment, at least one processing level of the multiple processing levels of the encoder network includes a dense calculation block, and at least one processing level of the multiple processing levels of the decoder network includes a dense calculation block. A M-th dense calculation block in each of the encoder network and the decoder network includes N convolution modules, wherein an input of an i-th convolution module among the N convolution modules includes outputs of i−1 convolution modules previous to the i-th convolution module. At least one convolution module in the N convolution modules includes at least one group of asymmetric convolution kernels, wherein i, N and M are integers, M is greater than or equal to 1 and smaller than or equal to a total number of the dense calculation blocks in the encoder network and the decoder network, N is greater than or equal to 3, and i is greater than or equal to 3 and smaller than or equal to N. For example, all convolution modules of the N convolution modules each include at least one group of asymmetric convolution kernels, or only some convolution modules of the N convolution modules include at least one group of asymmetric convolution kernels. However, the present disclosure is not limited to this.

In this embodiment, any of the dense calculation blocks may include N convolution modules, and the numbers of convolution modules included in different dense calculation blocks may be the same or different. For example, a first dense calculation block may include five convolution modules, a second dense calculation block may include eight convolution modules, and a third dense calculation block may include five convolution modules.

In this embodiment, any of the dense calculation blocks is configured to perform multi-level feature extraction, and one dense calculation block corresponds to one processing level. When multiple dense calculation blocks are included in the encoder network and the decoder network, an order of the multiple dense calculation blocks may be determined according to an order of the processing levels of the encoder network and the decoder network. For example, if the encoder network includes two dense calculation blocks (respectively corresponding to a third processing level and a fifth processing level in the encoder network) and the decoder network includes one dense calculation block (corresponding to a third processing level in the decoder network), a dense calculation block corresponding to the third processing level in the encoder network may be marked as a first dense calculation block, a dense calculation block corresponding to the fifth processing level in the encoder network may be marked as a second dense calculation block, and a dense calculation block corresponding to the third processing level in the decoder network may be marked as a third dense calculation block. However, the present disclosure is not limited to this.

In this embodiment, the dense calculation blocks are effective dense calculation block with asymmetric convolution (EDA blocks, Effective Dense Asymmetric blocks). One dense calculation block includes multiple convolution modules, and an input of each convolution module except a first convolution module among the multiple convolution modules includes outputs from all convolution modules previous to this convolution module, so that dense connections may be formed among the multiple convolution modules in the dense calculation block. In this embodiment, the dense calculation blocks are used for feature extraction, which may greatly reduce parameters, reduce calculation amount, and improve the processing speed, and bring better anti-overfitting performance. In addition, at least one convolution module in the dense calculation block of this embodiment includes one or more groups of asymmetric convolution kernels, and the asymmetric convolution kernels are used for feature extraction, which may greatly reduce the calculation amount, thereby improving the processing speed.

In an exemplary implementation, a convolution module including at least one group of asymmetric convolution kernels among the N convolution modules may include asymmetric convolution kernels obtained by expanding the at least one group of asymmetric convolution kernels. For example, a certain one of the N convolution modules may include two groups of asymmetric convolution kernels, and a second group of asymmetric convolution kernels may be obtained by expanding a previous group of asymmetric convolution kernels, wherein the first group of asymmetric convolution kernels may include a 3×1 convolution kernel and a 1×3 convolution kernel. In this exemplary implementation, an expanded asymmetric convolution kernel may be obtained by performing an expansion operation on an asymmetric convolution kernel. The expanded asymmetric convolution kernel may be used to not only increase a receptive field, but also reduce the loss of spatial information in a process of image processing, and maintain the multiple convolution modules forming dense connections to generate feature maps with consistent resolution.

In an exemplary implementation, step 102 may include: the input image is down-sampled to obtain multiple first down-sampled feature maps with a first resolution; the multiple first down-sampled feature maps are down-sampled to obtain multiple second down-sampled feature maps with a second resolution; multi-level feature extraction is performed on the multiple second down-sampled feature maps by the first dense calculation block to obtain multiple first dense calculation feature maps with the second resolution; the multiple first dense calculation feature maps are down-sampled to obtain multiple third down-sampled feature maps with a third resolution; multi-level feature extraction is performed on the multiple third down-sampled feature maps by the second dense calculation block to obtain multiple second dense calculation feature maps with the third resolution. The multiple feature maps obtained by the encoder network in step 102 include the multiple second dense calculation feature maps.

In this exemplary implementation, step 103 may include: the multiple second dense calculation feature maps are up-sampled to obtain multiple first up-sampled feature maps with the second resolution; the multiple first up-sampled feature maps and the multiple second down-sampled feature maps are concatenated in a channel dimension to obtain a first fusion feature map group; feature extraction is performed on the first fusion feature map group to obtain multiple first intermediate feature maps with the second resolution; multi-level feature extraction is performed on the multiple first intermediate feature maps by a third dense calculation block to obtain multiple third dense calculation feature maps with the second resolution; the multiple third dense calculation feature maps and the multiple first dense calculation feature maps are concatenated in the channel dimension to obtain a second fusion feature map group; feature extraction is performed on the second fusion feature map group to obtain multiple second intermediate feature maps with the second resolution; the multiple second intermediate feature maps are up-sampled to obtain multiple second up-sampled feature maps with the first resolution; the multiple second up-sampled feature maps and the multiple first down-sampled feature maps are concatenated in the channel dimension to obtain a third fusion feature map group; feature extraction is performed on the third fusion feature map group to obtain multiple third intermediate feature maps with the second resolution; and the multiple third intermediate feature maps are up-sampled to obtain the target segmentation image with the same resolution as the input image.

In this exemplary implementation, the first dense calculation block may include five convolution modules, the second dense calculation block may include eight convolution modules, and the third dense calculation block may include five convolution modules. Among them, each convolution module in the first calculation block, the second calculation block and the third dense calculation block includes a 1×1 convolution kernel and two groups of asymmetric convolution kernels, a first group of asymmetric convolution kernels includes a 3×1 convolution kernel and a 1×3 convolution kernel, and a second group of asymmetric convolution kernels is obtained according to the first group of asymmetric convolution kernels and corresponding expansion coefficients.

Figure 4:
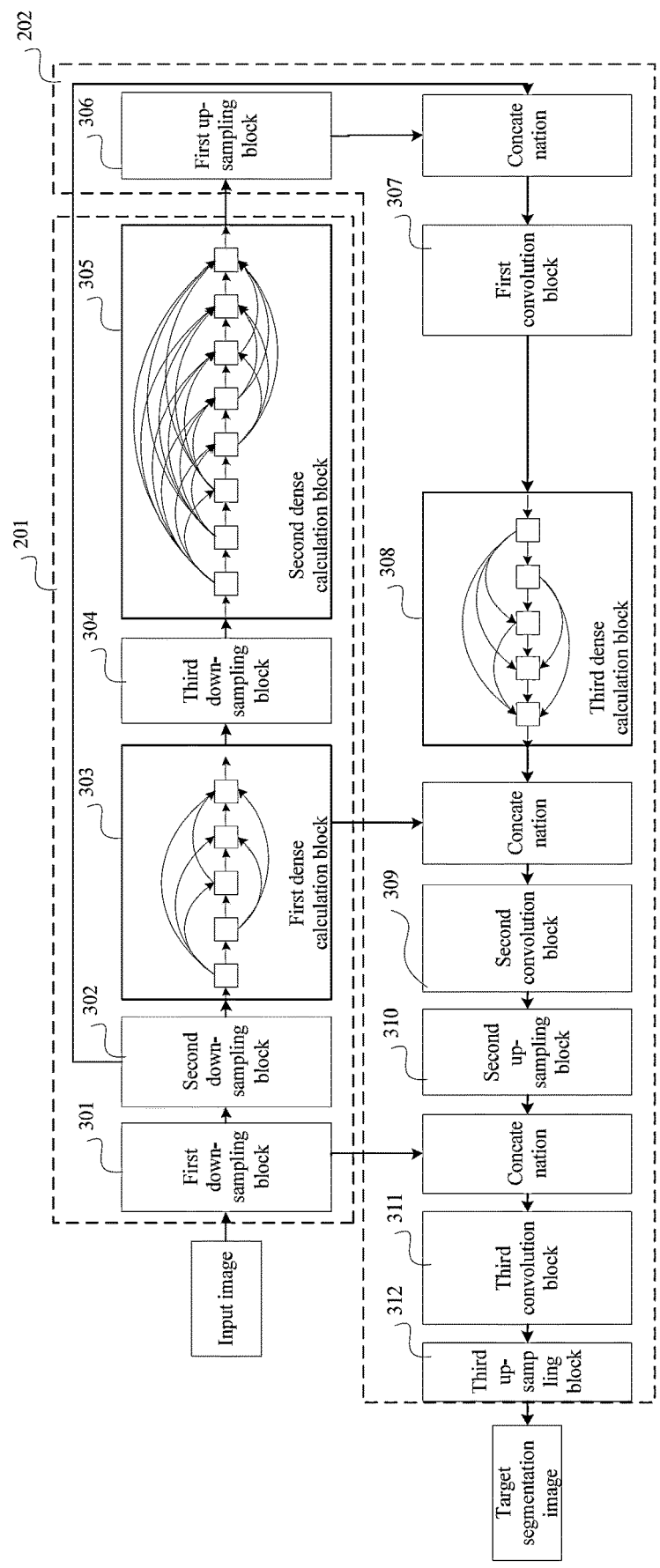
FIG. 4 is an example diagram of an encoder network and a decoder network according to an embodiment of the present disclosure.

FIG. 4 is an example diagram of an encoder network and a decoder network according to an embodiment of the present disclosure. In this exemplary embodiment, the convolutional neural network may perform image matting on a color person image (e.g., a color image of the input image shown in FIG. 2) to obtain a black and white matting mask (e.g., the target segmentation image shown in FIG. 2).

As shown in FIG. 4, an encoder network 201 includes a first down-sampling block 301, a second down-sampling block 302, a first dense calculation block 303, a third down-sampling block 304 and a second dense calculation block 305. Among them, the second down-sampling block 302 is located between the first down-sampling block 301 and the first dense calculation block 303, and the third down-sampling block 304 is located between the first dense calculation block 303 and the second dense calculation block 305.

In this exemplary embodiment, the first down-sampling block 301 is configured to down-sample an input image to obtain multiple first down-sampled feature maps with a first resolution. The second down-sampling block 302 is configured to down-sample the multiple first down-sampled feature maps to obtain multiple second down-sampled feature maps with a second resolution. The first dense calculation block 303 is configured to perform multi-level feature extraction on the multiple second down-sampled feature maps to obtain multiple first dense calculation feature maps with the second resolution. The third down-sampling block 304 is configured to down-sample the multiple first dense calculation feature maps to obtain multiple third down-sampled feature maps with a third resolution. The second dense calculation block 305 is configured to perform multi-level feature extraction on the multiple third down-sampled feature maps to obtain multiple second dense calculation feature maps with the third resolution. Among them, the first resolution is larger than the second resolution, the second resolution is larger than the third resolution, and the first resolution is smaller than the resolution of the input image.

In this exemplary embodiment, the encoder network 201 includes five processing levels, which respectively correspond to three down-sampling blocks and two dense calculation blocks. Among them, the three down-sampling blocks and the two dense calculation blocks are used to gradually extract multiple feature maps from the input image, and gradually reduce the spatial resolutions of the feature maps. Among them, the feature extraction is mainly realized by the down-sampling blocks and the dense calculation blocks, and reduction of the spatial resolutions of the feature maps is realized by the down-sampling blocks. Gradually reduction of spatial dimensions of the feature maps by using the multiple down-sampling blocks may enlarge the receptive field, so that the encoder network can better extract local and global features of different scales, and the down-sampling blocks may compress the extracted feature maps, thus saving calculation amount and memory occupation, and improving the processing speed.

As shown in FIG. 4, the decoder network 202 includes a first up-sampling block 306, a first convolution block 307, a third dense calculation block 308, a second convolution block 309, a second up-sampling block 310, a third convolution block 311 and a third up-sampling block 312. The first up-sampling block 306 is located between the second dense calculation block 305 and the first convolution block 307, the third dense calculation block 308 is located between the first convolution block 307 and the second convolution block 309, the second up-sampling block 310 is located between the second convolution block 309 and the third convolution block 311, and the third convolution block 311 is located between the second up-sampling block 310 and the third up-sampling block 311.

In this exemplary embodiment, the first up-sampling block 306 is configured to up-sample multiple second dense calculation feature maps output by the encoder network 201 to obtain multiple first up-sampled feature maps with a second resolution. The first convolution block 307 is configured to perform feature extraction on a first fusion feature map group obtained by concatenating the multiple first up-sampled feature maps and multiple second down-sampled feature maps in a channel dimension to obtain multiple first intermediate feature maps with the second resolution, wherein the multiple first up-sampled feature maps and the multiple second down-sampled feature maps have the same resolution. The third dense calculation block 308 is configured to perform multi-level feature extraction on the multiple first intermediate feature maps to obtain multiple third dense calculation feature maps with the second resolution. The second convolution block 309 is configured to perform feature extraction on a second fusion feature map group obtained by concatenating the multiple third dense calculation feature maps and the multiple first dense calculation feature maps in the channel dimension to obtain multiple second intermediate feature maps with the second resolution, wherein the multiple third dense calculation feature maps and the multiple first dense calculation feature maps have the same resolution. The second up-sampling block 310 is configured to up-sample the multiple second intermediate feature maps to obtain multiple second up-sampled feature maps with a first resolution. The third convolution block 311 is configured to perform feature extraction on a third fusion feature map group obtained by concatenating the multiple second up-sampled feature maps and the multiple first down-sampled feature maps in the channel dimension to obtain multiple third intermediate feature maps, wherein the multiple second up-sampled feature maps and the multiple first down-sampled feature maps have the same resolution. The third up-sampling block 312 is configured to perform an up-sampling operation on the multiple third intermediate feature maps to obtain the target segmentation image with the same resolution as the input image.

In this exemplary embodiment, the decoder network 202 includes seven processing levels, which respectively correspond to three up-sampling blocks, three convolution blocks and one dense calculation block. The spatial resolutions of the multiple feature maps extracted by the encoder network 201 is restored to be consistent with that of the input image by the three up-sampling blocks, and the feature extraction is performed by the three up-sampling blocks, the three convolution blocks and the dense calculation block, so as to gradually transform the multiple feature maps extracted by encoder network 201 into the target segmentation image of the input image.

In this exemplary embodiment, if a spatial resolution of an original input image is 1, the first resolution may be ½, the second resolution may be ¼, and the third resolution may be ⅛. Assuming that a size of the original input image is H×W, wherein H and W represent a length and a width of the input image, a feature map with the first resolution has a size of (H/2)×(W/2), a feature map with the second resolution has a size of (H/4)×(W/4), and a feature map with the third resolution has a size of (H/8)×(W/8).

In this exemplary embodiment, as shown in FIG. 4, a skip connection is established between the encoder network 201 and the decoder network 202, and the skip connection mode between the encoder network 201 and the decoder network 202 may be in a concatenation (Concat) mode. As shown in FIG. 4, both the resolution of the multiple first down-sampled feature maps obtained by the first down-sampling block 301 and the resolution of the multiple second up-sampled feature maps obtained by the second up-sampling block 310 are the first resolution, so the multiple first down-sampled feature maps obtained by the first down-sampling block 301 are not only input to the second down-sampling block 302, but also are input, after being concatenated with the multiple second up-sampled feature maps obtained by the second up-sampling block 310 in the channel dimension, to the third convolution block 311. Both the resolution of the multiple second down-sampled feature maps obtained by the second down-sampling block 302 and the multiple first up-sampled feature maps obtained by the first up-sampling block 306 are the second resolution, so the multiple second down-sampled feature maps obtained by the second down-sampling block 302 are not only input to the first dense calculation block 303, but also are input, after being concatenated with the multiple first up-sampled feature maps obtained by the first up-sampling block 306 in the channel dimension, to the first convolution block 307. Both the resolution of the multiple first dense calculation feature maps obtained by the first dense calculation block 303 and the resolution of the multiple third dense calculation feature maps obtained by the third dense calculation block 308 are the second resolution, so the multiple first dense calculation feature maps obtained by the first dense calculation block 303 are not only input to the third down-sampling block 304, but also are input, after being concatenated with the multiple third dense calculation feature maps obtained by the third dense calculation block 308 in the channel dimension, to the second convolution block 309.

In this exemplary embodiment, concatenating feature maps with the same resolution and size according to the channel dimension is an increase in the number of channels of feature maps with the same resolution and size. For example, a feature map output by the first dense calculation block 303 is Channel1×h×w, wherein h and w represent a length and a width of the feature map, and Channel1 represents the number of output channels of the first dense calculation block 303. A feature map output by the third dense calculation block 308 is Channel2×h×w, wherein Channel2 represents the number of output channels of the third dense calculation block 308. The feature maps output by the first dense calculation block 303 and the third dense calculation block 308 have the same size and resolution, then the second fusion feature map group obtained by concatenating the feature maps output by the first dense calculation block 303 and the third dense calculation block 308 in the channel dimension is (Channel1+Channel2)×h×w.

In this exemplary embodiment, the skip connection between the encoder network 201 and the decoder network 202 may transfer image details and information lost by the encoder network 201 during multiple down-sampling processes to the decoder network 202, so that the decoder network 202 may use the information to generate a more accurate target segmentation image in a process of restoring the spatial resolution by up-sampling, thereby improving the image matting effect.

In this exemplary embodiment, the first down-sampling block 301 has 3 input channels, and 15 output channels. The second down-sampling block 302 has 15 input channels and 60 output channels. The first dense calculation block 303 has 60 input channels and 260 output channels. The third down-sampling block 304 has 260 input channels and 130 output channels. The second dense calculation block 305 has 130 input channels and 450 output channels. The first up-sampling block 306 has 450 input channels and 60 output channels. The first convolution block 307 has 120 input channels and 60 output channels. The third dense calculation block 308 has 60 input channels and 260 output channels. The second convolution block 309 has 520 input channels and 260 output channels. The second up-sampling block 310 has 260 input channels and 15 output channels. The third convolution block 311 has 30 input channels and 15 output channels. The third up-sampling block 312 has 15 input channels and 1 output channel.

In this exemplary embodiment, any convolution block in the decoder network may include a convolution layer and an activation layer, wherein the convolution layer is followed by the activation layer. The convolution layer is configured to perform a convolution operation and may include one or more convolution kernels. The structures and parameters of multiple convolution blocks in the convolutional neural network of the present disclosure may be different from each other, or at least partially the same. However, the present disclosure is not limited to this.

In this exemplary embodiment, any down-sampling block in the encoder network may include a convolution layer, a pooling layer and an activation layer. The convolution layer is configured to perform a convolution operation and may include one or more convolution kernels. Among them, the pooling layer is a form of down-sampling, and may be configured to reduce the scale of the input image, simplify calculation complexity and reduce the over-fitting phenomenon to a certain extent. The pooling layer may compress the features and extract main features of the input image. The structures and parameters of the multiple down-sampling blocks may be different from each other, or at least partially the same. However, the present disclosure is not limited to this.

In this exemplary embodiment, any down-sampling block in the encoder network is configured to perform a down-sampling operation, which may reduce the size of the feature map, compress the features, and extract the main features, so as to simplify the calculation complexity and reduce the over-fitting phenomenon to a certain extent. Among them, the down-sampling operation may include: maximum value merging, average value merging, random merging, under-sampling (decimation, for example, selecting fixed pixels), demultiplexing output (demuxout, for example, splitting the input image into multiple smaller images), etc. However, the present disclosure is not limited to this.

In this exemplary embodiment, any up-sampling block in the decoder network may include an up-sampling layer and an activation layer, wherein the up-sampling layer may include a convolution layer. The convolution layer is configured to perform a convolution operation and may include one or more convolution kernels. The structures and parameters of multiple up-sampling blocks may be different from each other, or at least partially the same. However, the present disclosure is not limited to this.

In this exemplary embodiment, any up-sampling layer in the decoder network is configured to perform an up-sampling operation. The up-sampling operation may include maximum merging, strides transposed convolutions, interpolation (for example, interpolation, quadratic cubic interpolation, etc.), etc. However, the present disclosure is not limited to this.

In this exemplary embodiment, the number of the up-sampling blocks in the decoder network 220 is the same as the number of the down-sampling blocks in the encoder network 210, so that the target segmentation image and the input image have the same resolution, and it may be ensured that feature maps obtained by two processing levels skip-connected have a same resolution.

In this exemplary embodiment, the first dense calculation block 303 includes five convolution modules, and an input of any convolution module except a first convolution module in the first dense calculation block 303 includes outputs of all convolution modules previous to this convolution module. The second dense calculation block 305 includes eight convolution modules, and an input of any convolution module except a first convolution module in the second dense calculation block 305 includes outputs of all convolution modules previous to this convolution module. The third dense calculation block 308 includes five convolution modules, and an input of any convolution module except a first convolution module in the third dense calculation block 308 includes outputs of all convolution modules previous to this convolution module. In this embodiment, the convolution modules in the first dense calculation block 303, the second dense calculation block 305 and the third dense calculation block 308 realize dense connection through a series connection.

Figure 5:
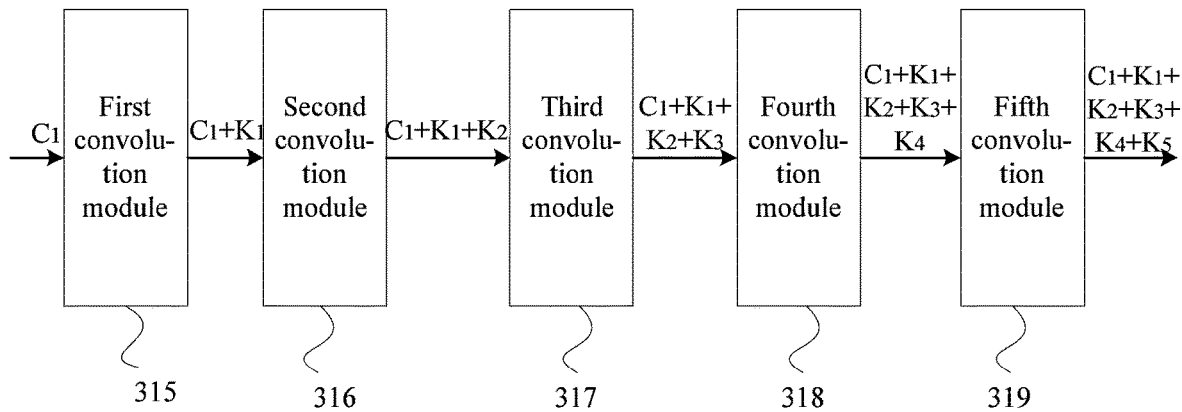
FIG. 5 is an example diagram of a first dense calculation block according to an embodiment of the present disclosure.

The following takes the first dense calculation block 303 as an example to illustrate a structure of a dense calculation block in FIG. 4. FIG. 5 is an exemplary diagram of a first dense calculation block 303 according to an embodiment of the present disclosure. As shown in FIG. 5, the first dense calculation block 303 includes a first convolution module 315, a second convolution module 316, a third convolution module 317, a fourth convolution module 318 and a fifth convolution module 319 connected in series. As shown in FIG. 5, taking the first convolution module 315 and the second convolution module 316 as examples, the first convolution module 315 is configured to receive and process $C_1$ feature maps to obtain $K_1$ feature maps, and concatenate the $C_1$ feature maps and the $K_1$ feature maps in a channel dimension to obtain $C_1+K_1$ feature maps. The second convolution module 316 is configured to receive and process $C_2$ feature maps to obtain $K_2$ feature maps, and concatenate the $C_2$ feature maps and the $K_2$ feature maps in a channel dimension to obtain $C_2+K_2$ feature maps, wherein the $C_2$ feature maps are the $C_1+K_1$ feature maps obtained by the first convolution module 315. In this embodiment, the first convolution module 315 has $C_1$ input channels, and $C_1+K_1$ output channels. The second convolution module 316 has $C_1+K_1$ input channels and $C_1+K_1+K_2$ output channels. In the same way, the third convolution module 317 has $C_1+K_1+K_2$ input channels, and $C_1+K_1+K_2+K_3$ output channels. The fourth convolution module 318 has $C_1+K_1+K_2+K_3$ input channels and $C_1+K_1+K_2+K_3+K_4$ output channels. The fifth convolution module 319 has $C_1+K_1+K_2+K_3+K_4$ input channels and $C_1+K_1+K_2+K_3+K_4+K_5$ output channels. In other words, the input of the third convolution module 317 includes the outputs of the previous first convolution module 315 and second convolution module 316, the input of the fourth convolution module 318 includes the outputs of the previous first convolution module 315, second convolution module 316 and third convolution module 317, and the input of the fifth convolution module 319 includes the outputs of the previous first convolution module 315, second convolution module 316, third convolution module 317 and fourth convolution module 318.

In this example, a growth rate coefficient of any convolution module is the same, and the growth rate coefficient of the convolution module is the number of channels increased of the number of output channels of the convolution module compared to the number of input channels of the convolution module. As shown in FIG. 5, $K_1$, $K_2$, $K_3$, $K_4$ and $K_5$ are all identical.

In this example, a structure of each dense calculation block in FIG. 4 illustrates a transmission mode in which each convolution module processes the input feature maps to obtain multiple feature maps (an i-th convolution module obtains $K_i$ feature maps). FIG. 5 shows a whole series connection mode of multiple convolution modules in the dense calculation block, which is equivalent to the transmission mode of $K_i$ feature map of the i-th convolution module presented in FIG. 4.

Figure 6:
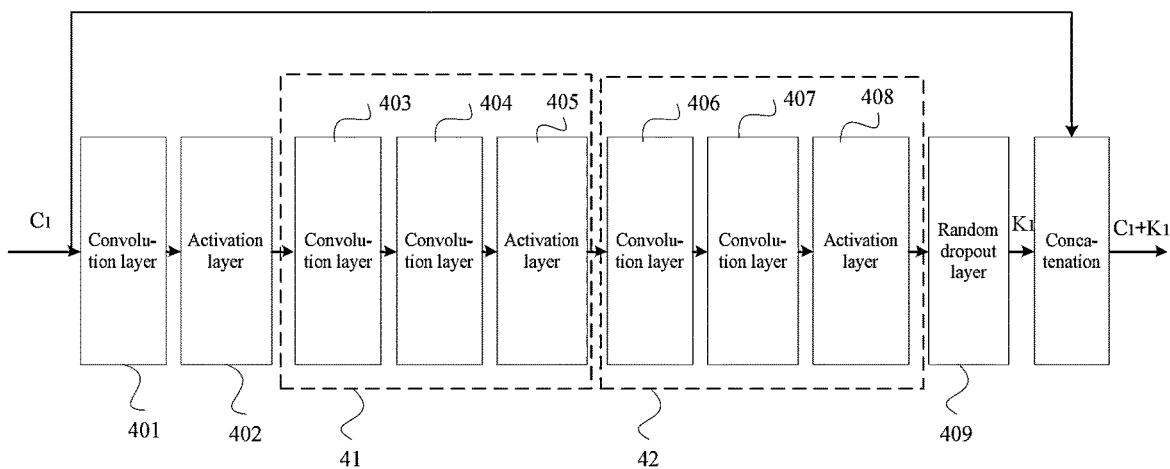
FIG. 6 is an example diagram of a first convolution module according to an embodiment of the present disclosure.

The following takes the first convolution module 315 as an example to illustrate a structure of any convolution module in a dense calculation block. FIG. 6 is an exemplary diagram of a first convolution module 315 according to an embodiment of the present disclosure. As shown in FIG. 6, in this example, the first convolution module includes a convolution layer 401, an activation layer 402, a first asymmetric convolution network 41, a second asymmetric convolution network 42 and a random dropout layer 409 which are cascaded in sequence. The first asymmetric convolution network 41 includes a convolution layer 403, a convolution layer 404 and an activation layer 405 which are cascaded in sequence. The second asymmetric convolution network 42 includes a convolution layer 406, a convolution layer 407 and an activation layer 408 which are cascaded in sequence. In this example, the first convolution module 315 includes two groups of asymmetric convolution kernels. However, present disclosure is not limited to this.

As shown in FIG. 6, the first convolution module has $C_1$ input channels and $C_1+K_1$ output channels. Among them, the convolution layer 401 has $C_1$ input channels and $K_1$ output channels, the convolution layers 403 and 404 each have $K_1$ input channels and $K_1$ output channels, the convolution layers 406 and 407 each have $K_1$ input channels and $K_1$ output channels.

As shown in FIG. 6, an input of the first convolution module and an output result of the dropout layer 409 are connected in a concatenation mode to generate an output result of the first convolution module. In other words, the output result of the first convolution module is a concatenation result of an input feature map of the first convolution module and a feature map generated by the convolution network in a channel dimension. In this way, a dense connection may be formed after multiple convolution modules are connected in series, that is, any convolution module in the dense calculation block receives and processes output results of all convolution modules previous to this convolution module.

In this exemplary embodiment, a convolution kernel of the convolution layer 401 is 1×1. The convolution layer 401 with the convolution kernel of 1×1 may reduce the dimensionality when the convolution module performs a feature extraction operation, which reduces the number of the feature maps, reduces the calculation amount, and increases a nonlinearity of the convolutional neural network.

In this exemplary embodiment, in the first asymmetric convolution network 41, a convolution kernel of the convolution layer 403 is 3×1, and a convolution kernel of the convolution layer 404 is 1×3. In the second asymmetric convolution network 42, a convolution kernel of the convolution layer 406 is obtained by performing an expansion operation on the convolution kernel of 3×1, and a convolution kernel of the convolution layer 407 is obtained by performing an expansion operation on the convolution kernel of 1×3, where an expansion coefficient of the expansion operation may be d. Different convolution modules in the same dense calculation block may adopt the same or different expansion coefficients, or a part of the convolution modules adopt the same expansion coefficient. However, the present disclosure is not limited to this. In this example, performing the expansion operation on the asymmetric convolution kernel may not only increase the receptive field, but also reduce the loss of spatial information, and maintain the resolutions of feature maps output by densely connected convolution modules to be consistent. In this exemplary embodiment, by adopting two groups of asymmetric convolution kernels for feature extraction, the calculation amount may be greatly reduced, thereby increasing the processing speed.

In this exemplary embodiment, the dropout layer 409 may effectively prevent over-fitting, and the dropout layer 409 may be automatically turned off in a non-training stage. However, the present disclosure is not limited to this.

In this exemplary embodiment, the structures and parameters of the second convolution module 316, the third convolution module 317, the fourth convolution module 318 and the fifth convolution module 319 in FIG. 5 may be the same or partially the same as those of the first convolution module 315. However, the present disclosure is not limited to this.

Exemplarily, multiple convolution modules in one dense calculation block may select different growth rate coefficients and expansion coefficients. However, the present disclosure is not limited to this.

In the exemplary embodiment shown in FIG. 4, the growth rate coefficients of all convolution modules included in three dense calculation blocks (the first dense calculation block 303, the second dense calculation block 305 and the third dense calculation block 308) may all be 40. The expansion coefficients of five convolution modules included in the first dense calculation block 303 may be (1, 1, 1, 2, 2), respectively. The expansion coefficients of five convolution modules included in the third dense calculation block 303 may be (1, 1, 1, 2, 2), respectively. The expansion coefficients of the eight convolution modules included in the second dense calculation block may be (2, 2, 4, 4, 8, 8, 16, 16), respectively. Among them, the structures and parameters of the first dense calculation block 303 and those of the third dense calculation block 308 may be completely the same.

In this exemplary embodiment, the activation layer may include an activation function, which is used to introduce a nonlinear factor into the convolutional neural network, so that the convolutional neural network may better solve complex problems. The activation function may include a linear correction unit (ReLU) function, a s-type function (Sigmoid function) or a hyperbolic tangent function (tanh function). The ReLU function is an unsaturated nonlinear function, and the Sigmoid function and the tanh function are saturated nonlinear functions. The activation layer may be used as a layer of the convolutional neural network alone, or the activation layer may be contained in the convolution layer. In an example, the activation layer may include a normalization layer and the activation function.

For example, in the first convolution module shown in FIG. 6, the activation layer 402 is configured to perform an activation operation on an output of the convolution layer 401, the activation layer 405 is configured to perform an activation operation on an output of the convolution layer 404, and the activation layer 408 is configured to perform an activation operation on an output of the convolution layer 407. The activation layers 402, 405, and 408 may each include a normalization layer and an activation function. Among them, the activation functions in different activation layers may be the same or different, and the normalization layers in different activation layers can be the same or different. However, the present disclosure is not limited to this.

According to the method for processing an image provided by this exemplary embodiment, an input portrait image may be automatically matted by a convolutional neural network combined with a dense calculation block having asymmetric convolution kernels and an encoder/decoder networks with skip connection, and a result of image matting may be obtained in real time, thus improving the processing speed and the accuracy of the result of image matting.

In an exemplary embodiment, the method for processing an image provided by the embodiment of the present disclosure further includes: a convolutional neural network including an encoder network and a decoder network is trained. Before using the convolutional neural network for image matting, it is necessary to train the convolutional neural network. After being trained, parameters of the convolutional neural network remain unchanged during the image processing. In a training process, the parameters of the convolutional neural network will be adjusted according to a training result to obtain an optimized convolutional neural network. In this example, the parameters of the convolutional neural network may include a convolution kernel and an offset. The convolution kernel determines how to process an image to be processed, and the offset determines whether an output of the convolution kernel is input to a next layer.

Figure 7:
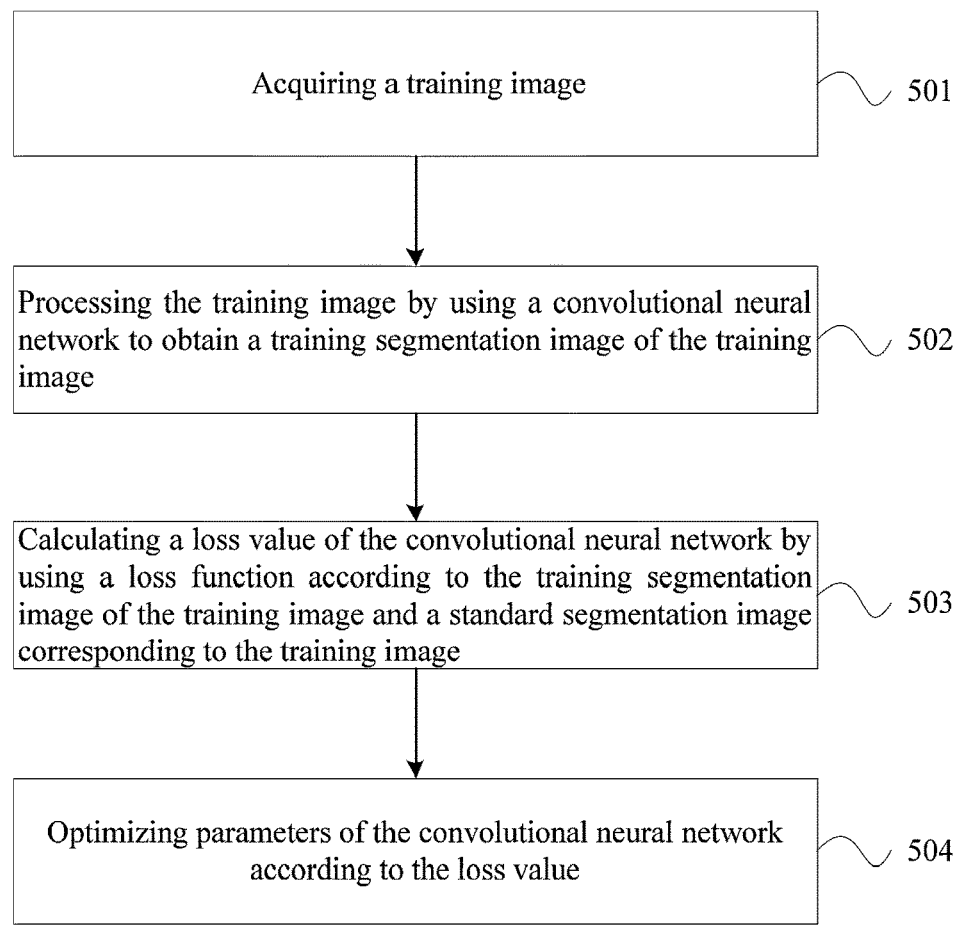
FIG. 7 is an example flowchart of training of a convolutional neural network according to an embodiment of the present disclosure.
Figure 8:
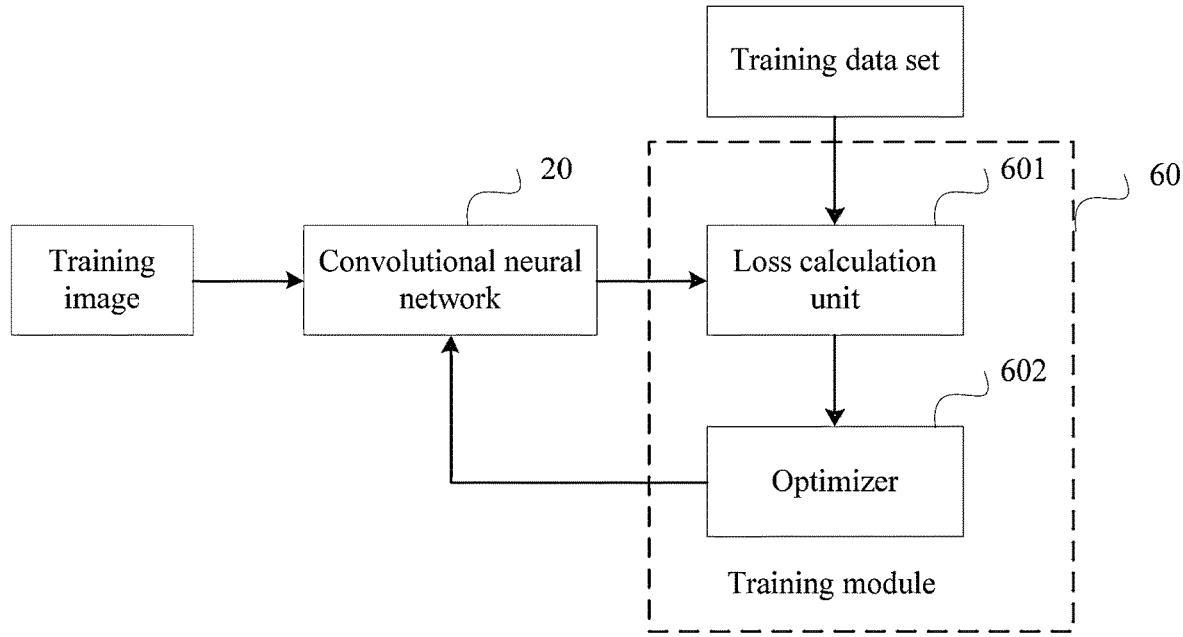
FIG. 8 is a schematic diagram of training of a convolutional neural network according to an embodiment of the present disclosure.

FIG. 7 is an example flowchart of training of a convolutional neural network according to an embodiment of the present disclosure. FIG. 8 is a schematic diagram of training of a convolutional neural network according to an embodiment of the present disclosure.

As shown in FIG. 7, the training of the convolutional neural network may include the following steps 501 to 504.

In step 501, a training image is acquired. For example, the training image may be selected from two matting data sets, a segment matting human and portrait matting. Or, a picture that does not contain portraits in a common objects in context (COCO) dataset may be used to replace a background of the above two matting data sets, so as to realize data expansion. However, the present disclosure is not limited to this.

In step 502, the training image is processed by using a convolutional neural network to generate a training segmentation image. This process is the same as the process of processing the input image to generate the target segmentation image by using the convolutional neural network, so it will not be repeated here.

In step 503, a loss value of the convolutional neural network is calculated by using a loss function according to the training segmentation image and a standard segmentation image corresponding to the training image.

In step 504, parameters of the convolutional neural network are optimized according to the loss value.

Among them, the loss function is an important equation for measuring the difference between a predicted value (the training segmentation image) and a target value (the standard segmentation image). For example, the higher an output value (loss) of the loss function is, the greater the difference is.

In this example, whether to end the training is determined by determining whether the convolutional neural network converges or not. Determining whether the convolutional neural network converges or not may be done in at least one of the following manners: determining whether the number of times of updating the parameters of the convolutional neural network reaches an iteration threshold; and determining whether the loss value of the convolutional neural network is lower than a loss threshold. The iteration threshold may be a preset number of iterations. For example, if the number of times of updating the parameters of the convolutional neural network is greater than the iteration threshold, the training is ended. The loss threshold may be preset. For example, if the loss value calculated by the loss function is smaller than the loss threshold, the training is ended.

As shown in FIG. 8, a training module 60 may include a loss calculation unit 601 and an optimizer 602. The loss calculation unit 601 is configured to calculate a loss value of a convolutional neural network 20 using a loss function, and the optimizer 602 is configured to optimize parameters of the convolutional neural network 20 according to the loss value. The convolutional neural network 20 performs image matting on a training image, and may generate a training segmentation image. The loss calculation unit 601 acquires a standard segmentation image corresponding to the training image from a training data set, and calculates the loss value by using the loss function according to the training segmentation image and the standard segmentation image. The optimizer 602 adjusts the parameters of the convolutional neural network 20 according to the loss value calculated by the loss calculation unit 601. In an example, the optimizer may use a random gradient descent method, and a cosine annealing method with restart is used as a learning rate adjustment strategy of the optimizer. However, the present disclosure is not limited to this.

In an exemplary embodiment, the loss function may be obtained by weighted addition of an edge loss function, a matting mask loss function and a foreground loss function. That is, the loss function may be expressed as:

$$L=w_1 L_{edge}+w_2 L_{alpha}+w_3 L_{foreground};$$

where $L_{edge}$ is the edge loss function, $L_{alpha}$ is the matting mask loss function, $L_{foreground}$ is the foreground loss function, $w_1$, $w_2$ and $w_3$ are weights. $w_1$, $w_2$ and $w_3$ may be determined according to actual situations or empirical values, and the present disclosure is not limited to this.

In an exemplary implementation, the edge loss function may be expressed as:

$$L_{edge}=|G(A_{out})-G(A_{gt})|;$$

where $$G(A_{gt})=\sqrt{G_x^2(A_{gt})+G_y^2(A_{gt})}, G_x(A_{gt})=K_x \times A_{gt}, G_y(A_{gt})=K_y \times A_{gt}; G(A_{gt})=\sqrt{G_x^2(A_{gt})+G_y^2(A_{gt})}, G_x(A_{gt})=K_x \times A_{gt}, G_y(A_{gt})=K_y \times A_{gt};$$

$K_x$ and $K_y$ are edge detection operators, $A_{out}$ is the training segmentation image, and $A_{gt}$ is the standard segmentation image corresponding to the training image.

The edge detection operator may be Sobel, Prewitt, Scharr and other operators, however, the present disclosure is not limited to this.

Exemplarily, the edge detection operator may be selected as Scharr operator, that is:

$$K_x = \begin{bmatrix} -3 & 0 & 3 \\ -10 & 0 & 10 \\ -3 & 0 & 3 \end{bmatrix}, K_y = \begin{bmatrix} -3 & -10 & -3 \\ 0 & 0 & 0 \\ 3 & 10 & 3 \end{bmatrix}.$$

In this exemplary implementation, since the fineness and accuracy of an edge in the result of image matting is closely related to the image matting effect, the edge loss function is designed by using the edge detection operator to constrain an edge of a subject to be matted in the result of image matting, so as to obtain a better image matting effect.

In an exemplary implementation, the matting mask loss function may be expressed as:

$$L_{alpha}=|A_{out}-A_{gt}|;$$

The foreground loss function may be expressed as:

$$L_{foreground} = \frac{1}{3k}\sum_{i=1}^{k}\sum_{i=1}^{3}|A_{out}^{i}I^{ij} - A_{gt}^{i}I^{ij}|;$$

where $A_{out}$ is the training segmentation image, $A_{gt}$ is the standard segmentation image corresponding to the training image, and I is the training image; $A_{out}^{i}$ is an i-th pixel of the training segmentation image $A_{out}$, $A_{gt}^{i}$ is an i-th pixel of the standard segmentation image $A_{gt}$, and $I^{ij}$ is a j-th channel of an i-th pixel of the training image I.

According to the method for processing an image provided by the embodiment of the present disclosure, a convolutional neural network combining a dense calculation block with asymmetric convolution kernels with an encoder/decoder networks with skip connection may be used to realize real-time automatic image matting of an input image, and improve the image matting effect, that is, not only a high-quality image may be output, but also the processing speed is greatly improved. Furthermore, the exemplary embodiment of the present disclosure adopts an edge loss function, a matting mask loss function and a foreground loss function in a training process of the convolutional neural network, which can improve the image matting effect.

Figure 9:
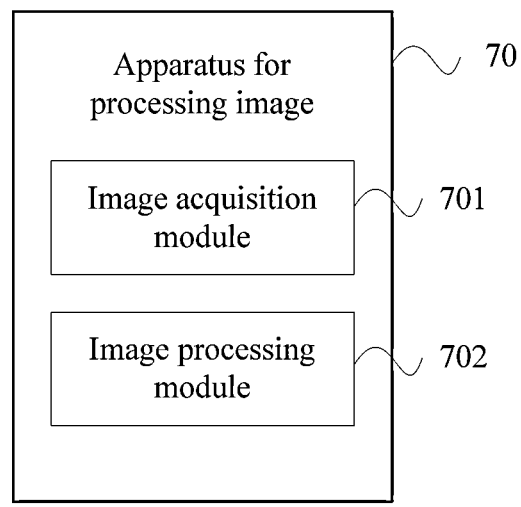
FIG. 9 is a schematic diagram of an apparatus for processing an image according to an embodiment of the present disclosure.

FIG. 9 is a schematic diagram of an apparatus for processing an image according to an embodiment of the present disclosure. As shown in FIG. 9, an image processing apparatus 70 for processing an image provided by this embodiment includes an image acquisition module 701 and an image processing module 702. These components are interconnected by a bus system or other form of connection mechanism (not shown). The components and structures of the apparatus for processing an image shown in FIG. 9 are only exemplary, rather than restrictive, and the apparatus for processing an image may have other components and structures as required.

In this exemplary embodiment, the image acquisition module 701 is configured to acquire an input image. The image acquisition module 701 may include a memory in which the input image is stored. Or, the image acquisition module 701 may include one or more cameras to acquire the input image. For example, the image acquisition module 701 may be hardware, software, firmware and any feasible combination thereof.

In this exemplary embodiment, the image processing module 702 is configured to perform down-sampling and feature extraction on the input image through an encoder network to obtain multiple feature maps. Up-sampling and feature extraction are performed on the multiple feature maps through a decoder network to obtain a target segmentation image.

In this exemplary embodiment, the encoder network and the decoder network each include multiple processing levels, and multiple feature maps obtained at a L-th processing level in the encoder network and multiple feature maps obtained at a J-th processing level in the decoder network are input, after being fused, to a (J+1)-th processing level in the decoder network, wherein the multiple feature maps obtained at the L-th processing level in the encoder network and the multiple feature maps obtained at the J-th processing level in the decoder network have the same resolution, and L and J are both positive integers.

In this exemplary embodiment, at least one processing level of the multiple processing levels of the encoder network includes a dense calculation block, and at least one processing level of the multiple processing levels of the decoder network includes a dense calculation block. A M-th dense calculation block in each of the encoder network and decoder network includes N convolution modules, and an input of an i-th convolution module among the N convolution modules includes outputs of i−1 convolution modules previous to the i-th convolution module. At least one convolution module of the N convolution modules includes at least one group of asymmetric convolution kernels. i, N and M are all integers, M is greater than or equal to 1 and smaller than or equal to a total number of the dense calculation blocks in the encoder network and the decoder network, N is greater than or equal to 3, and i is greater than or equal to 3 and smaller than or equal to N.

The image processing module 702 in the apparatus 70 for processing an image provided by this embodiment includes a convolutional neural network, which has the same structure and function as the convolutional neural network in the above embodiment of the method for processing an image, so it will not be described here again.

In an exemplary embodiment, the apparatus for processing an image may further include a training module configured to train the convolutional neural network. The training module may include a loss calculation unit and an optimizer. A process of training the convolutional neural network by using the training module may refer to the relevant description in the above embodiment of the method for processing an image, so it will not be described in detail here.

Figure 10:
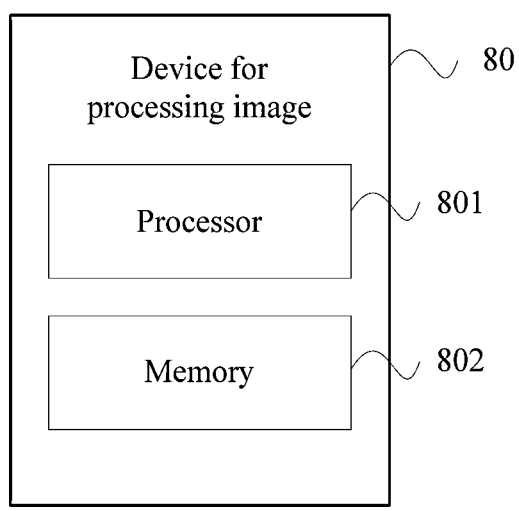
FIG. 10 is a schematic diagram of a device for processing an image according to an embodiment of the present disclosure.

FIG. 10 is a schematic diagram of a device for processing an image according to an embodiment of the present disclosure. As shown in FIG. 10, the device 80 for processing an image includes a processor 801 and a memory 802. The memory 802 is configured to store program instructions, and the program instructions, when executed by the processor 801, implements the steps of the method for processing an image in any of the above embodiments. The components of the device 80 for processing an image shown in FIG. 10 are only exemplary, rather than restrictive, and the device 80 for processing an image may also have other components according to actual application requirements. For example, the processor 801 and the memory 802 may communicate with each other directly or indirectly.

For example, components such as the processor 801 and the memory 802 may communicate with each other through a network connection. A network may include a wireless network, a wired network, or any combination of a wired network and a wireless network. The network may include a local area network, Internet, a telecommunication network, an internet-based internet of things, a telecommunication network-based internet of things, any combination of the above networks. The wired network, for example, may use twisted pair, coaxial cable or optical fiber transmission etc. for communication, and the wireless network, for example, may use communication modes such as 3G, 4G, 5G mobile communication networks, Bluetooth or WIFI etc. for communication. The types and functions of the network are not limited in the present disclosure.

For example, the processor 801 may control other components in the image processing device to perform desired functions. The processor 801 may be a central processing unit (CPU), a tensor processing unit (TPU), a graphics processing unit (GPU), and other devices with data processing capability or program execution capability. The GPU may be directly integrated into a motherboard or built in a north bridge chip of the motherboard; or, the GPU may be built into the CPU.

For example, the memory 802 may include any combination of one or more computer program products, wherein the computer program products may include various forms of computer readable storage media, such as a volatile memory or a non-volatile memory. The volatile memory may include, for example, a random access memory (RAM) or a cache memory. The non-volatile memory may include, for example, a read only memory (ROM), a hard disk, an erasable programmable read only memory (EPROM), a universal serial bus (USB) memory, or a flash memory. The computer-readable storage media may also store one or more application programs and one or more types of data, for example, an input image, and one or more types of data used or generated by the application programs, etc.

For example, one or more computer readable codes or program instructions may be stored in the memory 802, and the processor may run the program instructions to execute the above method for processing an image. The method for processing an image may refer to the relevant descriptions in the above embodiments of the method for processing an image, so it will not be described in detail here.

An embodiment of the present disclosure further provides a computer readable storage medium in which executable instructions are stored, and the executable instructions, when executed, implement the above method for processing an image.

Those of ordinary skill in the art may understand that all or some of the steps in the method, the system, and functional modules/units in the device disclosed above may be implemented as software, firmware, hardware, and an appropriate combination thereof. In a hardware implementation, a division between functional modules/units mentioned in the above description does not necessarily correspond to a division of physical components. For example, a physical component may have multiple functions, or a function or a step may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium) and a communication medium (or a transitory medium). As is well known to those of ordinary skills in the art, the term "computer storage medium" includes volatile and nonvolatile, removable and non-removable media implemented in any method or technology for storing information (such as computer readable instructions, a data structure, a program module or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

Those of ordinary skills in the art should understand that modifications or equivalent substitutions may be made to the technical solutions of the present disclosure without departing from the essence and scope of the technical solutions of the present disclosure, all of the modifications and equivalent substitutions should be included within the scope of the claims of the present disclosure.

What is claimed is:

1. A method for processing an image, comprising:
acquiring an input image;
performing down-sampling and feature extraction on the input image by an encoder network to obtain a plurality of feature maps; and
performing up-sampling and feature extraction on the plurality of feature maps by a decoder network to obtain a target segmentation image;
wherein the encoder network and decoder network each comprises a plurality of processing levels, a plurality of feature maps obtained at a L-th processing level in the encoder network and a plurality of feature maps obtained at a J-th processing level in the decoder network are input, after being fused, to a (J+1)-th processing level in the decoder network, and wherein the plurality of feature maps obtained at the L-th processing level in the encoder network and the plurality of feature maps obtained at the J-th processing level in the decoder network have a same resolution; L and J are both positive integers;
wherein at least one processing level of the plurality of processing levels of the encoder network comprises a dense calculation block, and at least one processing level of the plurality of processing levels of the decoder network comprises a dense calculation block; a M-th dense calculation block in each of the encoder network and the decoder network comprises N convolution modules, and an input of an i-th convolution module among the N convolution modules comprises outputs of i−1 convolution modules previous to the i-th convolution module; at least one convolution module of the N convolution modules comprises at least one group of asymmetric convolution kernels; i, N and M are all integers, M is greater than or equal to 1 and smaller than or equal to a total number of the dense calculation blocks in the encoder network and the decoder network, N is greater than or equal to 3, and i is greater than or equal to 3 and smaller than or equal to N.

2. The method for processing an image according to claim 1, wherein the at least one convolution module of the N convolution modules further comprises an asymmetric convolution kernel obtained by expanding the at least one group of asymmetric convolution kernels.

3. The method for processing an image according to claim 1, wherein the plurality of feature maps obtained at the L-th processing level in the encoder network and the plurality of feature maps obtained at the J-th processing level in the decoder network being input, after being fused, to the (J+1) th processing level in the decoder network, comprises:
the plurality of feature maps obtained at the L-th processing level in the encoder network and the plurality of feature maps obtained at the J-th processing level in the decoder network are input, after being concatenated in a channel dimension, to the (J+1)-th processing level in the decoder network.

4. The method for processing an image according to claim 1, wherein performing down-sampling and feature extraction on the input image by the encoder network to obtain the plurality of feature maps comprises:
performing down-sampling on the input image to obtain a plurality of first down-sampled feature maps with a first resolution;
performing down-sampling on the plurality of first down-sampled feature maps to obtain a plurality of second down-sampled feature maps with a second resolution;
performing multi-level feature extraction on the plurality of second down-sampled feature maps by a first dense calculation block to obtain a plurality of first dense calculation feature maps with the second resolution;
performing down-sampling on the plurality of first dense calculation feature maps to obtain a plurality of third down-sampled feature maps with a third resolution; and
performing multi-level feature extraction on the plurality of third down-sampled feature maps by a second dense calculation block to obtain a plurality of second dense calculation feature maps with the third resolution;
wherein the plurality of feature maps comprise the plurality of second dense calculation feature maps.

5. The method for processing an image according to claim 4, wherein performing up-sampling and feature extraction on the plurality of feature maps by the decoder network to obtain the target segmentation image comprises:
performing up-sampling on the plurality of second dense calculation feature maps to obtain a plurality of first up-sampled feature maps with the second resolution;
concatenating the plurality of first up-sampled feature maps and the plurality of second down-sampled feature maps in the channel dimension to obtain a first fusion feature map group;
performing feature extraction on the first fusion feature map group to obtain a plurality of first intermediate feature maps with the second resolution;
performing multi-level feature extraction on the plurality of first intermediate feature maps by a third dense calculation block to obtain a plurality of third dense calculation feature maps with the second resolution;
concatenating the plurality of third dense calculation feature maps and the plurality of first dense calculation feature maps in the channel dimension to obtain a second fusion feature map group;
performing feature extraction on the second fusion feature map group to obtain a plurality of second intermediate feature maps with the second resolution;
performing up-sampling on the plurality of second intermediate feature maps to obtain a plurality of second up-sampled feature maps with the first resolution;
concatenating the plurality of second up-sampled feature maps and the plurality of first down-sampled feature maps in the channel dimension to obtain a third fusion feature map group;
performing feature extraction on the third fusion feature map group to obtain a plurality of third intermediate feature maps with the second resolution; and
performing up-sampling on the plurality of third intermediate feature maps to obtain the target segmentation image with a same resolution as the input image.

6. The method for processing an image according to claim 5, wherein the first dense calculation block comprises five convolution modules, the second dense calculation block comprises eight convolution modules, and the third dense calculation block comprises five convolution modules; and each of the first dense calculation block, the second dense calculation block and the third dense calculation block comprises a 1×1 convolution kernel and two groups of asymmetric convolution kernels, a first group of asymmetric convolution kernels comprises a 3×1 convolution kernel and a 1×3 convolution kernel, and a second group of asymmetric convolution kernels is obtained according to the first group of asymmetric convolution kernels and corresponding expansion coefficients.

7. The method for processing an image according to claim 1, further comprising:
acquiring a training image;
processing the training image by using a convolutional neural network to obtain a training segmentation image of the training image, wherein the convolutional neural network comprises the encoder network and the decoder network;
calculating a loss value of the convolutional neural network by using a loss function according to the training segmentation image of the training image and a standard segmentation image corresponding to the training image; and
optimizing parameters of the convolutional neural network according to the loss value.

8. The method for processing an image according to claim 7, wherein the loss function is expressed as: $L=w_1 L_{edge} + w_2 L_{alpha} + w_3 L_{foreground}$;
wherein $L_{edge}$ is an edge loss function, $L_{alpha}$ is a matting mask loss function, $L_{foreground}$ is a foreground loss function, and $w_1$, $w_2$ and $w_3$ are weights.

9. The method for processing an image according to claim 8, wherein the edge loss function is expressed as: $L_{edge} = |G(A_{out}) - G(A_{gt})|$;
wherein $G(A_{out}) = \sqrt{G_x^2(A_{out}) + G_y^2(A_{out})}, G_x(A_{out}) = K_x \times A_{out}, G_y(A_{out}) = K_y \times A_{out}; G(A_{gt}) = \sqrt{G_x^2(A_{gt}) + G_y^2(A_{gt})}, G_x(A_{gt}) = K_x \times A_{gt}, G_y(A_{gt}) = K_y \times A_{gt};$ $K_x$ and $K_y$ are edge detection operators, $A_{out}$ is the training segmentation image, and $A_{gt}$ is the standard segmentation image corresponding to the training image.

10. The method for processing an image according to claim 8, wherein the matting mask loss function is expressed as: $L_{alpha} = |A_{out} - A_{gt}|$;
the foreground loss function is expressed as:

$$L_{foreground} = \frac{1}{3k} \sum_{i=1}^{k} \sum_{i=1}^{3} |A_{out}^i I^{ij} - A_{gt}^i I^{ij}|;$$

wherein $A_{out}$ is the training segmentation image, $A_{gt}$ is the standard segmentation image corresponding to the training image, and I is the training image; $A_{out}^i$ is an i-th pixel of the training segmentation image $A_{out}$, $A_{gt}^i$ is an i-th pixel of the standard segmentation image $A_{gt}$, and $I^{ij}$ is a j-th channel of an i-th pixel of the training image I.

11. The method for processing an image according to claim 1, wherein the input image is a person image and the target segmentation image is a matting mask of a target person in the person image.

12. An apparatus for processing an image, comprising:
a camera configured to acquire an input image; and
a processor configured to perform down-sampling and feature extraction on the input image by an encoder network to obtain a plurality of feature maps and perform up-sampling and feature extraction on the plurality of feature maps by a decoder network to obtain a target segmentation image;

wherein the encoder network and decoder network each comprises a plurality of processing levels, a plurality of feature maps obtained at a L-th processing level in the encoder network and a plurality of feature maps obtained at a J-th processing level in the decoder network are input, after being fused, to a (J+1)-th processing level in the decoder network, and wherein the plurality of feature maps obtained at the L-th processing level in the encoder network and the plurality of feature maps obtained at the J-th processing level in the decoder network have a same resolution; L and J are both positive integers;

wherein at least one processing level of the plurality of processing levels of the encoder network comprises a dense calculation block, and at least one processing level of the plurality of processing levels of the decoder network comprises a dense calculation block; a M-th dense calculation block in each of the encoder network and the decoder network comprises N convolution modules, and an input of an i-th convolution module among the N convolution modules comprises outputs of i−1 convolution modules previous to the i-th convolution module; at least one convolution module of the N convolution modules comprises at least one group of asymmetric convolution kernels; i, N and M are integers, M is greater than or equal to 1 and smaller than or equal to a total number of the dense calculation blocks in the encoder network and the decoder network, N is greater than or equal to 3, and i is greater than or equal to 3 and smaller than or equal to N.

13. A device for processing an image, comprising: a memory and a processor, wherein the memory is configured to store program instructions, and the processor, when executing the program instructions, implements steps of the method for processing an image according to claim 1.

14. A computer readable storage medium, in which program instructions are stored, wherein the program instructions, when executed, implement the method for processing an image according to claim 1.

15. The method for processing an image according to claim 2, wherein the input image is a person image and the target segmentation image is a matting mask of a target person in the person image.

16. The method for processing an image according to claim 3, wherein the input image is a person image and the target segmentation image is a matting mask of a target person in the person image.

17. The method for processing an image according to claim 4, wherein the input image is a person image and the target segmentation image is a matting mask of a target person in the person image.

18. The method for processing an image according to claim 5, wherein the input image is a person image and the target segmentation image is a matting mask of a target person in the person image.

19. The method for processing an image according to claim 6, wherein the input image is a person image and the target segmentation image is a matting mask of a target person in the person image.

20. The method for processing an image according to claim 7, wherein the input image is a person image and the target segmentation image is a matting mask of a target person in the person image.

* * * * *